March 28, 1939.  R. S. WHITTINGTON  2,152,121
AUTOMATIC CONTROL OF CLUTCH AND THROTTLE ACTUATION OF AUTOMOTIVE VEHICLES
Original Filed July 15, 1932
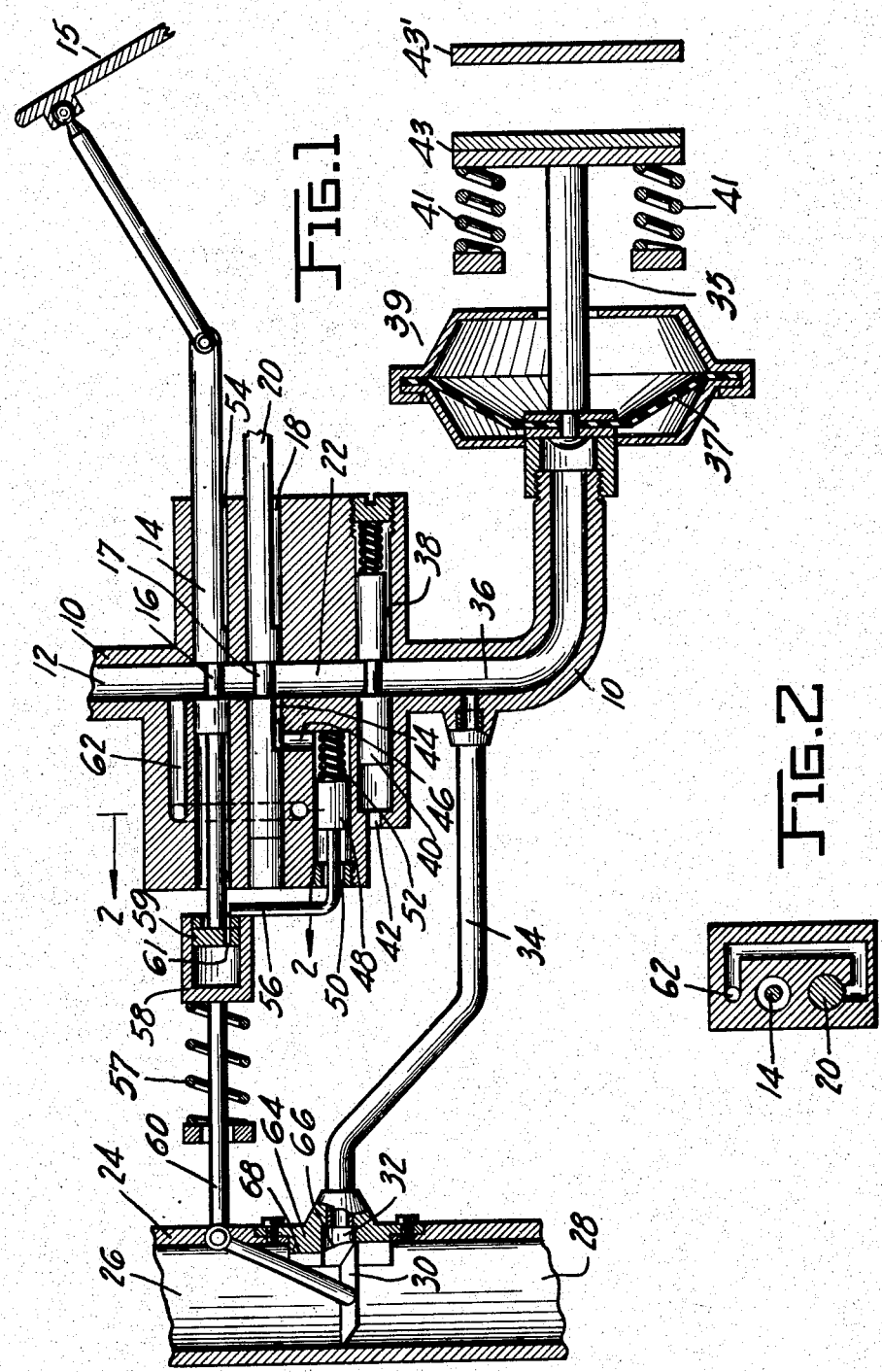
INVENTOR
RALPH S. WHITTINGTON
BY
H. O. Clayton
ATTORNEY Patented Mar. 28, 1939

2,152,121

UNITED STATES PATENT OFFICE 2,152,121

AUTOMATIC CONTROL OF CLUTCH AND THROTTLE ACTUATION OF AUTOMOTIVE VEHICLES

Ralph S. Whittington, Springfield, Mass., assignor to Bendix Products Corporation, South Bend, Ind., a corporation of Indiana Original application July 15, 1932, Serial No. 622,703. Divided and this application November 1, 1937, Serial No. 172,171

5 Claims. (Cl. 192—.01)

This invention relates to an automatic control means for use in controlling the actuation of throttle and clutch of an automotive vehicle in their proper relation.

One of the primary objects of this invention is to provide a control means of the above-mentioned character which will automatically control the disengagement and engagement of the clutch plates, and also control automatically the acceleration of the motor during the period that the clutch plates are contacting.

Still further, this invention contemplates the provision of a control means of the above-mentioned character which will allow the clutch plate pressure to increase or decrease accordingly as the accelerator is depressed or released during the range of clutch engagement.

This invention also provides means effecting a slower final contacting of the clutch plates at slow motor speeds than at higher motor speeds, when the accelerator is depressed rapidly.

Other objects of the invention and desirable details of construction and combinations of parts will become apparent from the following description of a preferred embodiment, which description is taken in conjunction with the accompanying drawing, in which:

Figure 1 is a semi-diagrammatic view, partly in section, of a control means constructed in accordance with this invention; and Figure 2 is a fragmentary sectional view taken substantially on line 2—2 of Figure 1.

In general, this invention provides an automatic control means for the clutch of an automotive vehicle which also accelerates the motor automatically at the instant that the clutch begins to engage. In prior devices of this nature, this has been accomplished by means of mechanical connection to the accelerator pedal of such kind that the carburetor throttle valve would be opened the proper amount at the time the clutch started engagement. However, this has been a delicate adjustment and one that required frequent adjustment to secure the proper relation of the throttle valve setting and the beginning of clutch plate contact.

This invention also provides a method of contacting the clutch plates under full control of the accelerator pedal position, giving the operator of the vehicle better control while maneuvering the car in close quarters.

Referring then to the drawing, there is shown in Figure 1 a system composed of a conduit 10 adapted to be connected to the intake manifold so that vacuum from the intake system acts in passage 12. Piston 14 is operated by the accelerator pedal 15. Vacuum can then act by piston 14 by virtue of reduced portion 16 and by reduced portion 17 of valve 20 to passage 22.

Carburetor riser 24 is divided into passage 26, adapted to be connected to the intake manifold, and passage 28, adapted to be connected to the carburetor, by carburetor throttle valve 30. Then port 32 is subject to the vacuum of the intake manifold as the motor idles and is made subject to near atmospheric pressure in passage 28 as the throttle valve 30 is opened. As the motor idles, vacuum acts through port 32, through conduit 34 to passage 36, and then through groove 38 of valve 40. Atmospheric pressure can then act through hole 42 to hold valve 40 in the position shown in Figure 1. Thus, a direct passage from passage 12 to passage 36 is provided, allowing vacuum from the intake system to energize a vacuum motor 39 to release the clutch. The clutch, diagrammatically illustrated by a driving plate 43, a driven plate 43' and clutch springs 41, is operated by the motor 39, the piston or power element 37 thereof being connected to the plate 43 by a rod 35.

Vacuum also acts through groove 44 of valve 20 and passage 46 on valve 48, allowing atmospheric pressure acting through hole 50 to overcome spring 52 and hold valve 48 in the position shown in Figure 1.

When the accelerator is depressed, piston 14 moves to shut off vacuum from passage 12 and allows atmosphere to enter passages 22 and 36 through groove 54 in piston 14. The atmosphere entering the motor 39 effects a deenergization thereof and allows the clutch springs 41 to expand. The clutch plates then move toward engagement and the expanding action of said springs creates a vacuum in the motor 39 to hold valve 40 open until the clutch plates contact. When the clutch plates contact, there is a drop in vacuum in the motor 39 and passage 36, thereby permitting a closing of the valve 40.

Also, the reduction of vacuum in passage 22 allows spring 52 to move valve 48, and arm 56 attached to the valve 48 contacts an enlargement 58 of carburetor throttle valve control rod 60. Thus spring 52, which is stronger than the throttle return spring 57, can act to open the carburetor throttle valve, as soon as the clutch plates contact to reduce the vacuum created by the clutch motor 39 in the passage 22. The enlargement 58 and a plunger 59 provided with a port 61 together constitute a dashpot mechanism in the connection between the accelerator 15 and the throttle 30: however, no claim is made to this dashpot mechanism, inasmuch as the same is disclosed and claimed in my Patent No. 2,103,284, dated December 28, 1937.

Control valve 20 is to be operated by the driver of the vehicle to render the automatic control system completely inoperative when desired. When piston 20 is moved inward, passage 12 is closed from passage 22, regardless of the accelerator position, and passage 22 is in communication with the atmosphere through groove 18 of piston 20. Thus the clutch cannot be completely released by vacuum acting through conduit 34. Air will be drawn through conduit 34, but the quantity need not be great enough to disturb the carburetion of the motor.

Also, as control piston 20 is moved inward, vacuum from passage 12 is allowed to act, through passage 62 and groove 44 of control piston 20 to passage 46, on piston 48, holding piston 48 in the position shown in Figure 1. This prevents the automatic acceleration of the motor while starting the vehicle manually.

Door 64 is attached to one side of the carburetor riser and provided with the radius 66, which conforms to the movement of throttle valve 30. As the throttle valve 30 is opened, the edge of the throttle valve passes directly over the face of port 32 without creating an opening of the throttle at this point. Thus an accurate means is provided of subjecting varying areas of port 32 to vacuum in passage 26 and near atmospheric pressure in passage 28. The use of door 64 makes possible the machine production of radius 66. Projection 68 is provided so that as the throttle valve is opened past the end of radius 66, the throttle opening at this point will start gradually.

The invention heretofore described is disclosed in my aforementioned Patent No. 2,103,284, dated December 28, 1937, this application constituting a division thereof.

While one illustrative embodiment has been described, it is not my intention to limit the scope of the invention to that particular embodiment, or otherwise than by the terms of the appended claims.

I claim:

1. In a system of the class described, the combination with the intake system and the carburetor throttle valve of the motor, of a pressure responsive means for releasing the clutch, means providing a passage between said intake system and said pressure responsive means, means when the motor is idling to open said passage whereby vacuum from said intake system actuates said pressure responsive means to release said clutch, means operating upon the actuation of said throttle valve control mechanism to reduce the vacuum action on said pressure responsive means whereby said clutch is moved toward engaged position, and a member responsive to pressure changes accompanying the operation of said system, said member acting to open said throttle valve upon a predetermined drop in vacuum in said system.

2. In a system of the class described, the combination with the intake system, the carburetor throttle valve and a mechanism for controlling the acceleration of the motor, of a pressure responsive means for releasing the clutch, means providing a passage between said intake system and said pressure responsive means, means when the motor is idling to open said passage whereby vacuum from said intake system actuates said pressure responsive means to release said clutch, means operating upon the actuation of said acceleration mechanism to reduce the vacuum acting on said pressure responsive means whereby said clutch is moved toward engaged position, a member responsive to the admission of atmosphere to said system by said acceleration control mechanism and to atmospheric pressure, and a resilient means actuating said member in opposition to atmospheric pressure, said resilient means acting to open said throttle valve upon a predetermined drop in vacuum in said system.

3. In an automatic control means for the clutch of an automotive vehicle, the combination with the intake system, the carburetor riser and throttle valve, and a mechanism for controlling the throttle valve, of a pressure responsive means for releasing the clutch, means providing a passage between said intake system and said pressure responsive means, a main valve in said passage operable to control communication between said passage and said intake system, and between said passage and the atmosphere, an auxiliary valve in said passage for closing the passage between atmosphere and said pressure responsive means, means operating when the aforementioned mechanism is released to actuate said main valve and said auxiliary valve to provide direct communication between said intake system and said pressure responsive means to release said clutch, means operating upon the actuation of said throttle valve control mechanism to actuate said main valve to close said passage from the intake system and open said passage to the atmosphere whereby said clutch is moved toward engaged position, means operative by conditions accompanying the partial engagement of the clutch to close said auxiliary valve, and a conduit connecting said passage between said auxiliary valve and said pressure responsive means, to said carburetor riser through a port, said port having all of its area exposed to vacuum in said intake system when said throttle valve is closed, but allowing its area to be exposed to pressure in said carburetor riser on the opposite side of said throttle valve as said throttle valve is opened, means controlling the capacity of said port and said conduit, said port being formed with a curved surface conforming to the motion of said throttle valve.

4. In an automatic control means for the clutch of an automotive vehicle, the combination with the intake system, the carburetor riser and throttle valve, and a mechanism for controlling the throttle valve, of a pressure responsive means for releasing the clutch, means providing a passage between said intake system and said pressure responsive means, a main valve in said passage operable to control communication between said passage and said intake system and between said passage and the atmosphere, an auxiliary valve in said passage for closing the passage between atmosphere and said pressure responsive means, means operating when the aforementioned mechanism is released to actuate said main valve and said auxiliary valve to provide direct communication between said intake system and said pressure responsive means to release said clutch, means operating upon the actuation of said throttle valve control mechanism to actuate said main valve to close said passage from said intake system and open said passage to the atmosphere whereby said clutch is moved toward engaged position, means operative by conditions accompanying the partial engagement of said clutch to close said auxiliary valve, a conduit connecting said passage between said auxiliary valve and said pressure responsive means to said carburetor riser through a port, said port having all of its area exposed to vacuum in said intake system when said throttle valve is closed, but allowing its area to be exposed to the pressure in said carburetor riser on the opposite side of said throttle valve as said throttle valve is opened, said port being formed with a curved surface conforming to the motion of said throttle valve, and said carburetor riser being adapted to receive a detachable member, said detachable member containing said port with curved surface.

5. In an automotive vehicle provided with a clutch, a throttle and an accelerator, linkage interconnecting the throttle and accelerator, power means for operating the clutch including a pressure differential operated motor operably connected to the clutch, valve means for initiating the clutch disengaging and engaging operations of the motor, and means, connected with the aforementioned throttle operating linkage and controlled by the motor, for automatically operating the linkage to open the throttle when and only when the clutch plates contact during the clutch engaging operation of the motor.

RALPH S. WHITTINGTON.